US007643724B2

(12) United States Patent
Lin et al.

(10) Patent No.: US 7,643,724 B2
(45) Date of Patent: *Jan. 5, 2010

(54) FAST MOTION TRICK MODE USING NON-PROGRESSIVE DUMMY PREDICTIVE PICTURES

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1012 days.

This patent is subject to a terminal disclaimer.

(21) Appl. No.: 10/493,349

(22) PCT Filed: Oct. 22, 2002

(86) PCT No.: PCT/US02/33825

§ 371 (c)(1),
(2), (4) Date: Apr. 22, 2004

(87) PCT Pub. No.: WO03/053053

PCT Pub. Date: Jun. 26, 2003

(65) Prior Publication Data

US 2005/0074225 A1  Apr. 7, 2005

Related U.S. Application Data

(60) Provisional application No. 60/334,914, filed on Oct. 23, 2001.

(51) Int. Cl.
*H04N 5/91* (2006.01)
(52) U.S. Cl. .......................................... 386/68; 386/111
(58) Field of Classification Search ................... 386/46, 386/68, 95, 111, 112, 125; 725/94
See application file for complete search history.

(56) References Cited

U.S. PATENT DOCUMENTS

| 5,701,386 A | 12/1997 | Yoneyama ................... 386/909 |
| 5,740,307 A | 4/1998 | Lane |
| 5,754,728 A | 5/1998 | Nakajima et al. .............. 386/68 |
| 6,016,382 A | 1/2000 | Yamagishi et al. ........... 386/109 |
| 6,192,186 B1 | 2/2001 | Murashima et al. |
| 6,219,381 B1 | 4/2001 | Sawada et al. .......... 375/240.14 |

(Continued)

FOREIGN PATENT DOCUMENTS

JP   HEI 9-9204   1/1997

(Continued)

*Primary Examiner*—Huy T Nguyen
(74) *Attorney, Agent, or Firm*—Robert D. Shedd; Robert B. Levy; Jorge Tony Villabon

(57) ABSTRACT

The invention concerns a method and system for performing a trick mode on a video signal containing a plurality of original pictures. The method includes the steps of selectively skipping at least one of the original pictures to convert the video signal to a trick mode video signal in response to a trick mode command and selectively inserting at least one dummy predictive picture in the trick mode video signal using field-based prediction. The method can also include the steps of monitoring the trick mode video signal in which the step of selectively inserting at least one dummy predictive picture in the trick mode video signal can be done if the bit rate of the trick mode video signal exceeds a predetermined threshold.

28 Claims, 5 Drawing Sheets

U.S. PATENT DOCUMENTS 6,248,944 B1    6/2001   Ito
6,865,747 B1 *  3/2005   Mercier ..................... 725/94
6,990,287 B2 *  1/2006   Lin et al. ................... 386/68
7,257,312 B2 *  8/2007   Lin et al. ................... 386/68

FOREIGN PATENT DOCUMENTS

| | | |
|---|---|---|
| JP | 9-121322 | 5/1997 |
| JP | 10-271442 | 10/1998 |
| JP | 11-146339 | 5/1999 |
| JP | 2000-244929 | 9/2000 |
| WO | WO 99/65239 | 12/1999 |

* cited by examiner

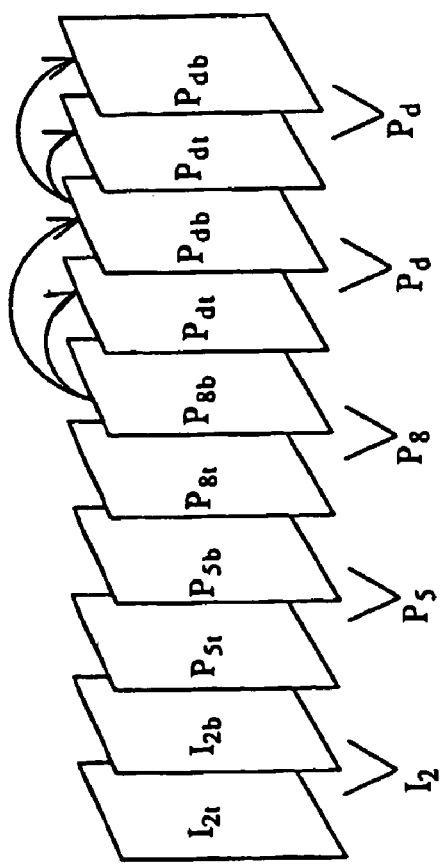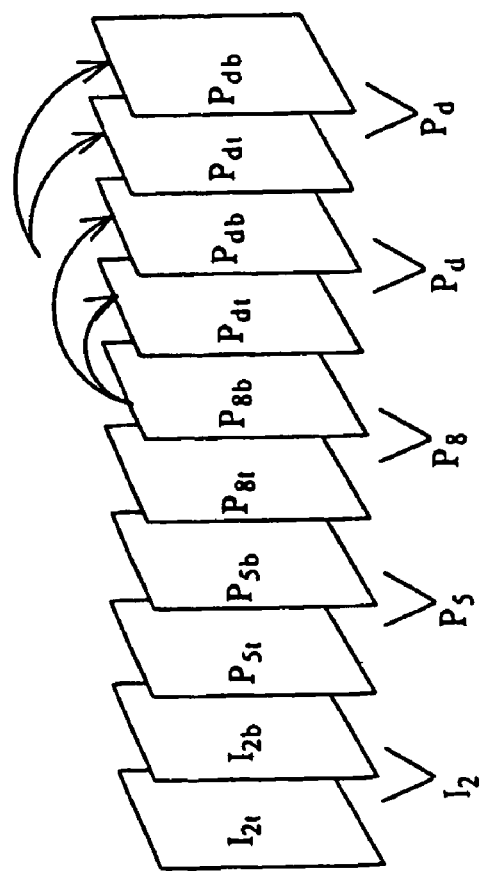

FAST MOTION TRICK MODE USING NON-PROGRESSIVE DUMMY PREDICTIVE PICTURES

This application claims the benefit under 35 U.S.C. § 365 of International Application PCT/US02/33825, filed Oct. 22, 2002, which claims the benefit of U.S. Provisional Application No. 60/334,914, filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTVs contain their own MPEG decoders. As such, if a digital video recorder or player is connected to a DTV, the video signal read from the disc is remotely decoded by the DTVs decoder. This configuration can be referred to as a remote decoder arrangement.

There is, however, an important disadvantage in decoding digitally encoded signals with a remote DTV decoder. Namely, it is very difficult to perform trick modes in this type of arrangement. A trick mode can be any playback of video in which the playback is not done at normal speed or in a forward direction. Oftentimes, a trick mode involves skipping a number of pictures in a video signal such as during a fast motion trick mode. Skipping pictures in a video signal being transmitted to a remote decoder can actually increase the average bit rate of the signal. As the bandwidth between the digital video recorder or player and the DTV is limited, performing a fast motion trick mode may cause the signal to exceed the maximum bit rate limit of the transmission channel.

For instance, in an MPEG video signal, there are three separate types of digitally encoded pictures: intra (I) pictures, predictive (P) pictures and bidirectional predictive (B) pictures. As is known in the art, I and P pictures contain relatively large amounts of encoded data, at least with respect to B pictures. During a fast motion trick mode, the first pictures in a group of pictures (GOP) to be skipped are typically the B pictures. As the B pictures are skipped, however, the average amount of encoded data for the remaining pictures, or the average number of bits per picture, in the GOP increases. Such a drawback can lead to buffer overflow and the loss of pictures during the display of the trick mode video signal.

In addition to the bit rate problem, there is another disadvantage to decoding video signals remotely: the repeated display of non-progressive pictures in such an arrangement can cause a vibration effect to appear in the display if the repeated pictures contain a moving object. To explain this drawback, a brief explanation of interlaced scanning is warranted.

Many televisions employ the interlaced scanning technique. Under this format, the video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the fields form a complete picture or frame. For an NTSC system, sixty fields are displayed per second, resulting in a rate of thirty frames per second.

As a moving object moves across the screen in an interlaced scanning television, each field will only display a portion of the moving object. This partial display occurs because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created 1/60 of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode, the trick mode video signal may contain repeated pictures, pictures that were recorded under the interlaced scanning format. For example, if the viewer initiates a freeze trick mode on a particular picture, then that picture can be repeatedly transmitted to and decoded and displayed at the DTV containing the remote decoder. The display of the repeated picture, however, is in accordance with the normal display of a non-progressive picture, i.e, the fields that make up the non-progressive picture are alternately displayed.

If a moving object appears in the pictures recorded under the interlaced scanning format, each field will display the moving object in one specific position. Thus, as these fields are alternately displayed during the freeze trick mode, the moving object in the display rapidly moves from one position in the display to another; in effect, the moving object appears to vibrate. This vibration is created because the interlaced fields are temporally distinct, and the moving object appears in a different position for each field.

This problem is also present in DTVs that include a deinterlacer. As is known in the art, a deinterlacer can construct complete frames from an interlaced field. Thus, a deinterlacer can construct complete frames out of the fields that comprise the repeated non-progressive frame. Nevertheless, these complete frames constructed from the interlaced fields will also be displayed in an alternate fashion thereby creating the possibility of the vibration artifact. In addition, this vibration effect appears in not only a freeze trick mode but may also be present in any other trick mode in which non-progressive pictures are repeated. Thus, it is desirable to eliminate the bit rate problem and the vibration artifact without increasing system costs or complexity.

SUMMARY OF THE INVENTION

The present invention concerns a method of performing a trick mode on a video signal containing a plurality of original pictures. The method includes the steps of selectively skipping at least one of the original pictures to convert the video signal to a trick mode video signal in response to a trick mode command and selectively inserting at least one dummy predictive picture in the trick mode video signal using field-based prediction. The method can also include the steps of monitoring the trick mode video signal and selectively inserting at least one dummy predictive picture in the trick mode video signal if the bit rate of the trick mode video signal exceeds a predetermined threshold.

In one arrangement, the selectively inserting step can include the step of selectively inserting at least a first dummy predictive picture in the trick mode video signal using field-based prediction and subsequent dummy predictive pictures in the trick mode video signal using frame-based prediction. The method can further include the step of predicting the at least first dummy predictive picture from a single field associated with a reference picture.

The reference picture can be an intra picture or a predictive picture. Additionally, the reference picture can be a non-progressive picture, a progressive picture or a field picture. In another arrangement, the plurality of original pictures can be contained within a group of pictures, and the reference picture that is used to predict the at least first dummy predictive picture can be the last original picture in the group of pictures such that no other original pictures are predicted from the inserted dummy predictive pictures. Also, the trick mode can be a fast motion trick mode.

In one aspect of the invention, each of the plurality of original pictures can contain a display indicator, and the method can further include the step of selectively modifying the display indicator of at least a portion of the plurality of original pictures to reflect an intended display order when an original picture is skipped. The display indicator can be a temporal reference field. Additionally, each temporal reference field can have an integer value, and the step of selectively modifying the temporal reference field of at least a portion of the plurality of original pictures can include the step of incrementally decreasing by one the integer value of the temporal reference field each time an original picture is skipped.

In another aspect, the method can further include the step of decoding at least a portion of the trick mode video signal with a remote decoder. In yet another aspect, the plurality of original pictures can be in a group of pictures and the method can further include the step of skipping a remaining original picture each time a dummy predictive picture is inserted in the trick mode video signal such that the last picture in the group of pictures is a dummy predictive picture and a desired playback speed is maintained following the insertion of the dummy predictive pictures.

The invention also concerns a method of performing a trick mode on a video signal containing a plurality of original pictures. The method includes the steps of selectively skipping at least one of the original pictures to convert the video signal to a trick mode video signal in response to a trick mode command and selectively inserting at least one non-progressive dummy predictive picture in the trick mode video signal using frame-based prediction.

The present invention also concerns a system for performing a trick mode on a video signal containing a plurality of original pictures. The system includes a controller for reading data representative of the video signal from a storage medium and outputting the video signal containing the plurality of original pictures and a processor in which the processor is programmed to selectively skip at least one of the original pictures to convert the video signal to a trick mode video signal in response to a trick mode command and selectively insert at least one dummy predictive picture in the trick mode video signal using field-based prediction. The system also includes suitable software and circuitry to implement the methods as described above.

BRIEF DESCRIPTION OF THE DRAWINGS

FIG. 4A illustrates one example of inserting dummy predictive pictures into a trick mode video signal in accordance with the inventive arrangements.

FIG. 4B illustrates another example of inserting dummy predictive pictures into a trick mode video signal in accordance with the inventive arrangements.

DETAILED DESCRIPTION OF THE PREFERRED EMBODIMENTS

Figure 1:
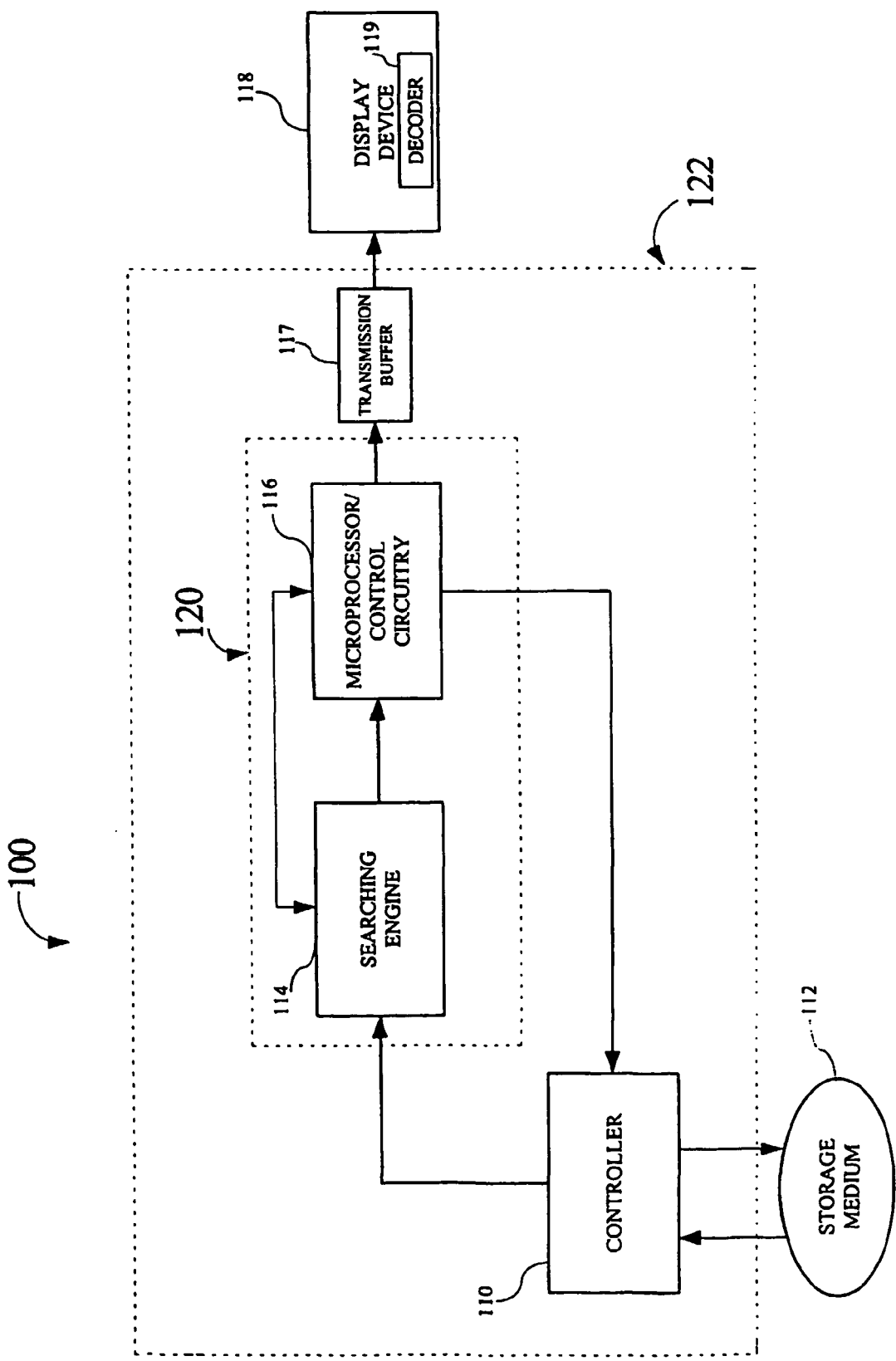
FIG. 1 is a block diagram of a system that can perform a fast motion trick mode using dummy predictive pictures in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116, a transmission buffer 117 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a processor 120 within contemplation of the present invention. Further, all or portions of the controller 110, the searching engine 114, the microprocessor 116 and the transmission buffer 117 can be a bitstream source 122 within contemplation of the present invention. In one arrangement, the display device 118 can contain its own decoder 119 for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In operation, the controller 110 can read a video signal containing a plurality of original pictures from the storage medium 112. These original pictures can be non-progressive pictures, progressive pictures or field pictures. In one arrangement, if the microprocessor 116 receives a trick mode command such as a fast motion command, then the microprocessor 116 can signal the searching engine 114 to locate one or more suitable original pictures in the trick mode video signal for purposes of skipping such a picture. Once located, the searching engine 114 can signal the microprocessor 116, and the microprocessor 116 can selectively skip at least one of the original pictures to convert the video signal to a trick mode video signal. The skipped pictures will not be decoded nor will they be displayed during the trick mode.

In addition, during the trick mode command, the microprocessor 116 can signal the searching engine 114 to locate another set of one or more suitable original pictures for purposes of inserting dummy predictive (dummy P) pictures into the trick mode video signal. A dummy P picture is a P picture that can be predicted from certain pictures in which the dummy P picture's motion vectors are set to zero and its residual signal is set to zero or not encoded.

Once a suitable original picture is located, the searching engine 114 can signal the microprocessor 116, and the microprocessor 116 can generate a corresponding dummy P picture predicted from the located original picture. The microprocessor 116 can then selectively insert at least one of the corresponding dummy P pictures such that the dummy P picture is sent to the transmission buffer 117 and on to the display device 118 and decoder 119. Inserting dummy P pictures in the trick mode video signal can cause the overall bit rate of the signal to decrease, as dummy P pictures contain relatively small amounts of encoded data.

Generating dummy P pictures in this manner, i.e., when the microprocessor 116 receives a trick mode command, is referred to as generating dummy P pictures "on-the-fly." Alternatively, the microprocessor 116 can generate dummy P pictures prior to the initiation of a trick mode command in which one or more of the dummy P pictures can be stored in memory (not shown). Once the microprocessor 116 receives a trick mode command, the microprocessor 116 can retrieve one or more of the dummy P pictures from memory and insert them into the trick mode video signal. In either arrangement, the dummy P pictures can be used to repeat original pictures such that the dummy P picture is transmitted to the display device 118 and displayed.

In another aspect of the invention, the microprocessor 116 can monitor the bit rate of the trick mode video signal. If the bit rate of the trick mode video signal exceeds a predetermined threshold, then the microprocessor 116, in conjunction with the searching engine 114, can perform the selectively inserting step discussed above in which at least one dummy P picture can be inserted in the trick mode video signal. Also, the microprocessor 116 can insert dummy P pictures into the trick mode video signal that are constructed in which at least a first dummy P picture can be generated using a form of field-based prediction to avoid the vibrating pictures problem. In one arrangement, subsequent dummy P pictures can be predicted using frame-based prediction. Several different techniques will be discussed later. In another arrangement, the microprocessor 116 can also skip a remaining original picture when a dummy P picture is inserted in the trick mode video signal to maintain a desired playback speed.

In another arrangement, the microprocessor 116 can modify certain portions of information contained within one or more of the plurality of original pictures contained in the trick mode video signal to reflect an intended display order. This modification step can be performed when original pictures are skipped. The overall operation of the invention will be discussed in greater detail below.

Fast Motion Trick Mode Using Non-Progressive Dummy Predictive Pictures

Figure 2:
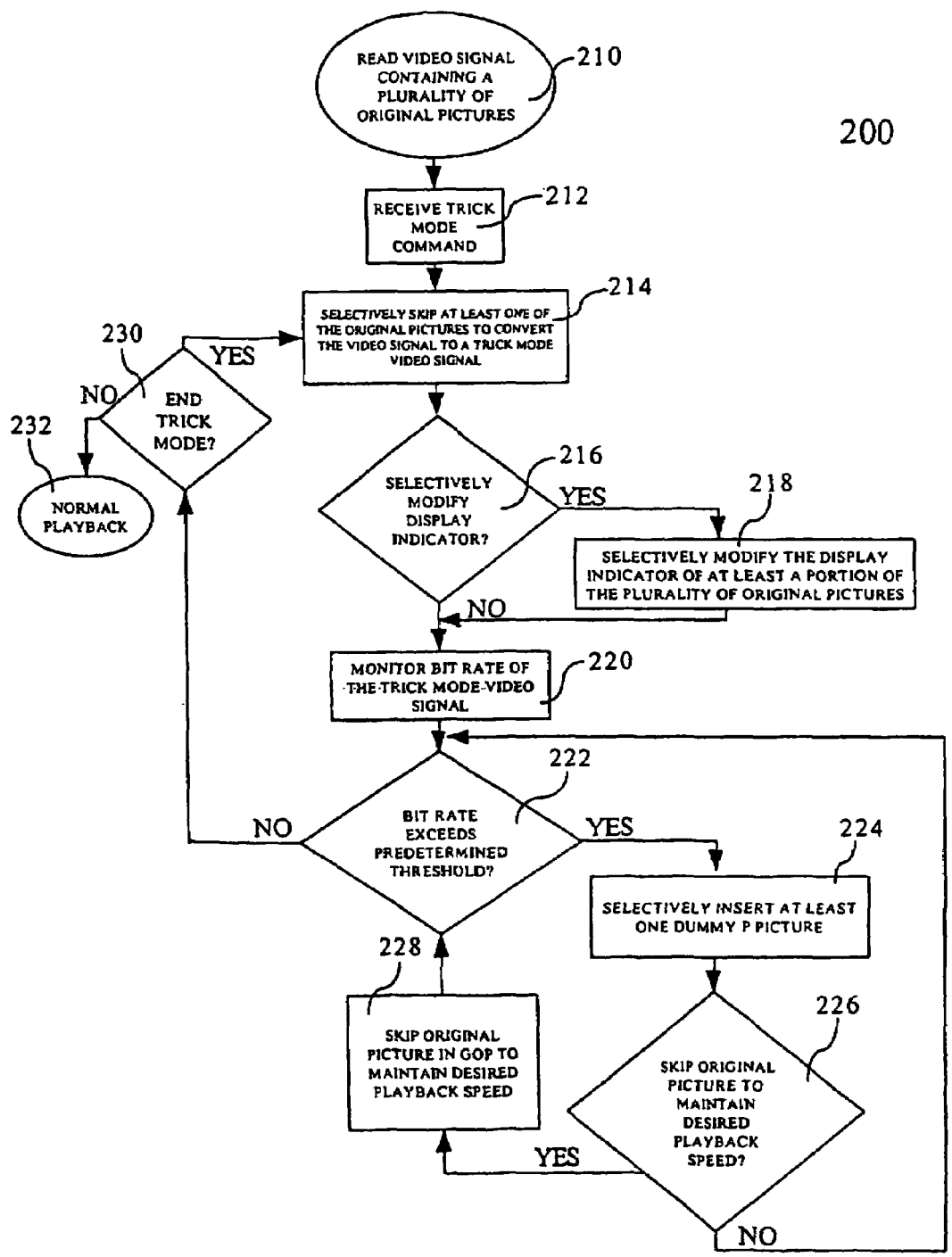
FIG. 2 is a flow chart that illustrates an operation of performing a fast motion trick mode using dummy predictive pictures in accordance with the inventive arrangements.

FIG. 2 illustrates a method 200 that demonstrates one way to operate in a trick mode, such as a fast motion trick mode, using non-progressive dummy P pictures. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder.

As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, a video signal containing a plurality of original pictures can be read. The original pictures can be non-progressive pictures, progressive pictures or field pictures. At step 212, a trick mode command can be received. For purposes of the invention, the trick mode command can be any command in which one or more of the original pictures are to be skipped, including a fast motion command such as fast forward or fast reverse. As shown at step 214, at least one of the original pictures can be selectively skipped. This selective skipping of pictures converts the video signal to a trick mode video signal.

Figure 3:
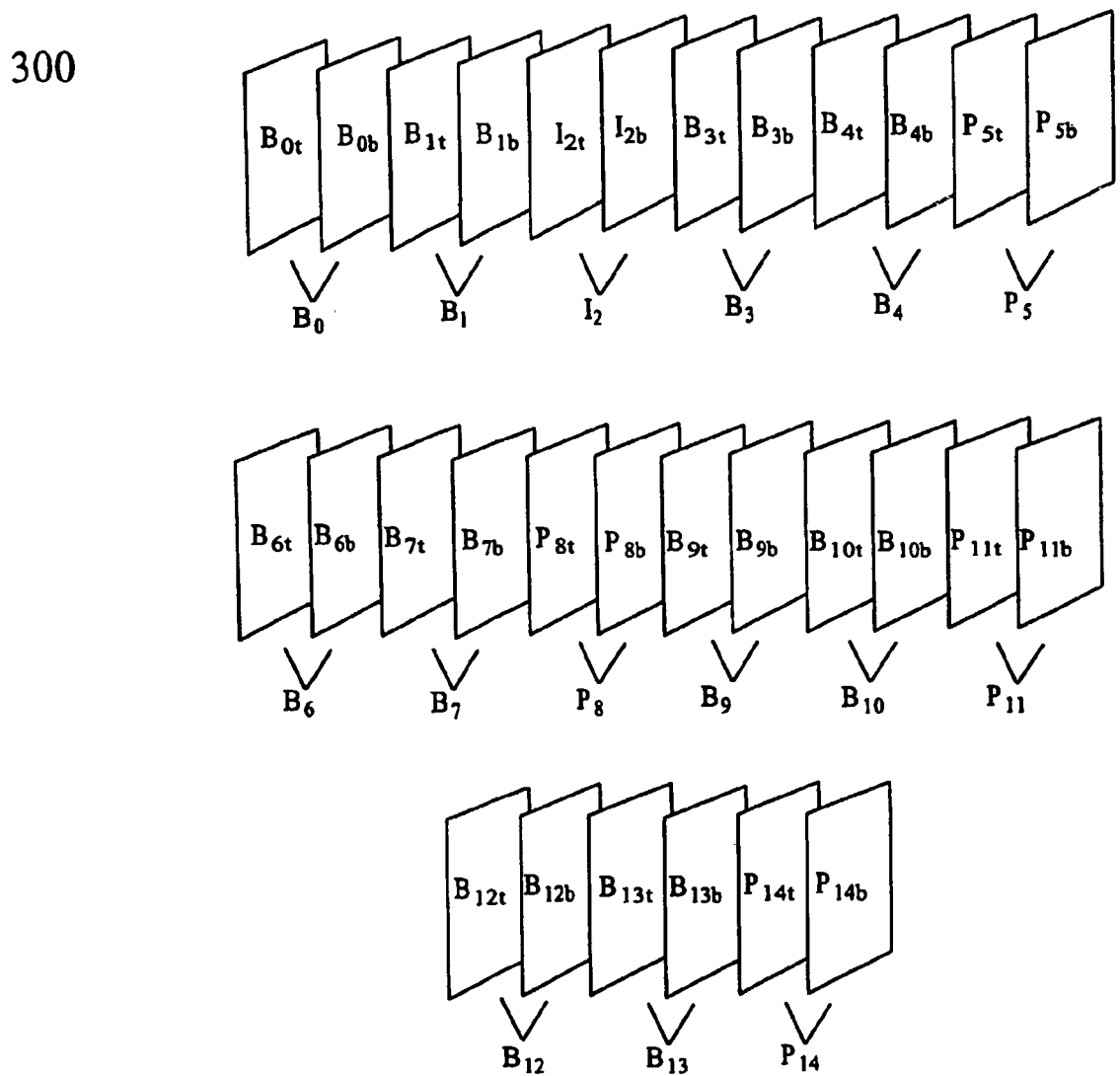
FIG. 3 illustrates a typical group of pictures structure in an MPEG video signal containing non-progressive pictures.

In one arrangement, the first original pictures to be skipped can be B pictures. Referring to FIG. 3, a typical group of pictures (GOP) 300 containing non-progressive pictures in display order is shown. The subscript numbers indicate when each picture will be displayed—relative to the other pictures in the GOP—at a normal playback speed. The lowercase letter "t" can represent a top field, and the lowercase letter "b" can represent a bottom field. This GOP 300 can be one of many GOPs in a video signal. Although the invention is not limited to this particular GOP structure, the GOP 300 will serve to illustrate how a fast motion trick mode can be performed. For example, if a fast forward playback of 3× is desired (1× represents normal playback), then all the B pictures in the GOP 300 can be skipped. Thus, for this particular GOP, only the picture $I_2$ and the P pictures will be transmitted and/or decoded and displayed.

For a faster trick mode speed, some of the P pictures can be skipped, and at certain speeds, the entire GOP 300 (including picture $I_2$) may be skipped. If P pictures are to be skipped, those of skill in the art will realize that it would be preferable to first skip the P pictures towards the end of the GOP. In this example, picture $P_{14}$ would be skipped first and then picture $P_{11}$ would be skipped and so on. Skipping pictures in this manner can preserve the proper decoding sequence necessary to decode those pictures that will be displayed during the trick mode.

In another embodiment, each of the plurality of original pictures can contain a display indicator. As determined at decision block 216, if the display indicators of these pictures are to be selectively modified, the display indicator of at least a portion of the plurality of original pictures can be selectively modified, as shown at step 218. Notably, modifying these display indicators can reflect an intended display order of the plurality of original pictures when an original picture is skipped. If the display indicators are not to be modified, then the method 200 can continue at step 220.

In one arrangement, the display indicator can be a temporal reference field. A temporal reference field is typically a ten bit field located in the picture header of digitally encoded pictures. Some decoders rely on the temporal reference field to determine when a particular picture in a video signal will be displayed relative to other pictures in the video signal. This field normally has an integer value.

As an example, referring once again to FIG. 3, GOP 300 contains fifteen pictures. The subscript numbers for the pictures in the GOP 300 can correspond to the integer values for each respective picture's temporal reference field. For instance, the temporal reference field of picture $B_0$, the first picture in the GOP, can have an integer value of zero. The temporal reference field of picture $B_1$, the next picture to be displayed, can have an integer value of one. Thus, the integer value of the temporal reference field for each subsequent picture to be displayed can be higher by one, all the way to picture $P_{14}$, whose temporal reference field can have an integer value of 14. For convenience, the phrase "integer value of the temporal reference field" can also be referred to as "integer value."

When an original picture is skipped, however, the display order according to the temporal reference fields of the original pictures is no longer valid. Accordingly, the integer value of the temporal reference fields of the original pictures that follow the skipped original pictures can be modified to indicate a proper display order.

For example, if pictures $B_9$ and $B_{10}$ are skipped, then the integer values of those original pictures that follow can be decreased by a value of two. So, the integer value of the temporal reference field of picture $P_{11}$ can be modified from eleven to nine, the integer value of the temporal reference field of picture $B_{12}$ can be modified from twelve to ten and so on. This modification process can continue until the end of the GOP 300 is reached and can ensure that the remaining pictures in the GOP 300 will be displayed in a proper order. Thus, each time an original picture in a GOP is skipped, the integer values of the temporal reference fields of the remaining pictures in that GOP that follow the skipped picture can be decreased by a value of one.

The step of modifying the integer values of the temporal reference fields of the non-skipped pictures in other GOPs in the trick mode video signal can be carried out in accordance with these examples. It must be noted, however, that the invention is not limited to this particular example, as other ways to modify the integer values of the relevant temporal reference fields to reflect an intended display order can be performed in any other suitable fashion. Moreover, it should be noted that the invention is not limited to the use of a temporal reference field, as any other suitable display indicator can be modified to reflect an intended display order in either of the embodiments discussed above.

Referring back to method 200 in FIG. 2, at step 220, the bit rate of the trick mode video signal can be monitored during the trick mode command. Monitoring the bit rate of the trick mode video signal may be necessary during a fast motion trick mode because, as mentioned earlier, skipping pictures may result in an increased average bit rate. In certain cases, this increased bit rate may exceed the maximum allowable bit rate for the transmission channel that is carrying the video signal. For purposes of the invention, this maximum allowable bit rate for the transmission channel can be referred to as a predetermined threshold.

At decision block 222, it can be determined whether the bit rate of the trick mode video signal has exceeded this predetermined threshold. If the bit rate has not reached the predetermined threshold, then the method 200 can continue at decision block 230. Referring back to step 222, if the bit rate has exceeded the predetermined threshold, then one or more dummy P pictures can be inserted in the trick mode video signal, as shown at step 224. In one arrangement, the dummy P pictures can be predicted using field-based prediction, or, alternatively, the dummy P pictures can be predicted using a combination of field-based and frame based prediction. That is, a dummy P picture can contain one or more fields, and each field can be predicted from another frame or field picture, including any field that makes up a frame picture. As will be explained below, inserting dummy P pictures into the trick mode video signal can help lower the bit rate of to such a signal.

As previously noted, a dummy P picture is a P picture that can be predicted from certain pictures in which the dummy P picture's motion vectors are set to zero and its residual signal is set to zero or not encoded. For example, in MPEG signals, a dummy P picture's discrete cosine transform (DCT) coefficients can be set to zero or not encoded. As such, a dummy P picture contains very little information. A dummy P picture's primary purpose is to duplicate or repeat the picture, or a field of the picture, from which it was predicted using very few bits. Thus, as dummy P pictures are placed into a fast motion trick mode video signal, the average number of bits per picture in the GOP decreases thereby lowering the average bit rate.

A picture from which a dummy P picture is predicted is commonly referred to as a reference picture, and any number of the original pictures can be reference pictures. In one arrangement, the reference picture can be either an I picture or a P picture. In fact, those of ordinary skill in the art will appreciate that dummy P pictures themselves can be considered to be reference pictures, as other dummy P pictures can be predicted from them. In addition, the reference picture can be either a non-progressive picture, a progressive picture or a field picture.

To illustrate an example of the insertion of dummy P pictures in a trick mode video signal, attention is once again directed to the GOP 300 in FIG. 3. If all the B pictures are skipped and pictures $P_{14}$ and $P_{11}$ are skipped (a playback speed of 5×), then any number of dummy P pictures can be inserted into the trick mode video signal to help lower the bit rate. The first of these dummy P pictures can be predicted from either picture $I_2$, $P_5$ or $P_8$ in accordance with the discussion below.

There are several preferred ways to insert dummy P pictures into the trick mode video signal. Inserting dummy P pictures in agreement with these preferred methods can lower the bit rate and can help control the vibrating pictures artifact without substantially degrading picture quality. FIG. 4A shows one such example.

As shown in trick mode GOP 400, two dummy P frame pictures can be inserted into the trick mode video signal (the lowercase "d" indicates that a P picture is a dummy P picture). In accordance with the inventive arrangements, the first dummy P frame picture can be predicted from a reference picture that is the last original picture in a GOP such that no other original pictures are predicted from the inserted dummy P pictures. Here, for example, the first dummy P frame picture can be predicted from reference picture $P_8$.

In addition, the fields that comprise the first dummy P frame picture can be predicted from a single field associated with the reference picture, in this case, field $P_{8b}$ of picture $P_8$. Although illustrated as being predicted from the second field of the first dummy P frame picture, the fields of the second dummy P frame picture can be predicted from either one of the fields of the first dummy P frame picture. In fact, the fields of the subsequent dummy P frame pictures are not limited to single field prediction from the previous dummy P frame picture. Nonetheless, because the first dummy P frame picture was predicted using single field prediction, the fields of the second dummy P frame picture, as well as any subsequent dummy P pictures, can be duplicates of the field from which the first dummy P frame picture was predicted.

Referring to FIG. 4B, another example of inserting dummy P pictures into a trick mode video signal in accordance with the inventive arrangements is illustrated. As shown in GOP 410 and similar to GOP 400 of FIG. 4A, the first dummy P frame picture can be predicted using single field-based prediction. Here, however, the subsequent dummy P pictures can be predicted using frame-based prediction. That is, each successive dummy P frame picture, following the first dummy P frame picture, can be predicted from the previous dummy P frame picture using frame-based prediction. For example, following the field-based prediction of the first dummy P frame picture, the fields of the second dummy P frame picture can be predicted from the first dummy P frame picture using frame-based prediction.

Of course, the invention is not limited to these particular examples, as any suitable number of dummy P frame pictures predicted from one or more other suitable reference pictures can be inserted into the trick mode video signal. Moreover, each field of each dummy P frame picture can be predicted from any suitable field of its corresponding reference picture, and the invention is not limited to predicting the first dummy P frame picture from a single field associated with a reference picture.

Using this particular prediction scheme, however, in which the fields of the first dummy P frame picture are predicted from a single field associated with a corresponding reference picture, particularly where the reference picture is the last original picture in the GOP, can help control the vibrating pictures artifact and provide a suitable picture display in addition to keeping the bit rate of the signal at an acceptable level. Specifically, predicting the fields of the first dummy P frame picture from a single field of the reference picture if dummy P frame pictures are used during a trick mode can produce a display in which a moving object appears in one specific position for each of the fields of the dummy P frame pictures to be displayed.

That is, if a moving object appears in the reference picture from which the first dummy P frame picture is predicted and the fields of the first dummy P frame picture are predicted from a single field of this reference picture, then each field of subsequent dummy P frame pictures will include the moving object in the same position as it is located in the single reference field. Accordingly, as the dummy P frame pictures are displayed during the trick mode, the moving object does not appear to vibrate.

Also, because the first dummy P frame picture is predicted from a reference picture that is the last original picture in the GOP, the single field prediction will not degrade picture quality. If an original picture is predicted from a dummy P picture whose fields are predicted from a single field associated with a reference picture, such a prediction scheme may cause problems in the original picture and subsequent original pictures because the dummy P pictures were not predicted from a complete picture. Inserting dummy P pictures following the last original reference picture, however, can avoid this dilemma.

In addition to inserting dummy P frame pictures, dummy P field pictures can be inserted into the trick mode video signal in accordance with the above discussion. These field pictures, by their very nature, can each be predicted from a single field of the preceding reference picture. For purposes of the invention and in view of the foregoing discussion, the term "dummy P pictures" can include dummy P frame pictures and dummy P field pictures except where expressly indicated.

It is also understood that the invention is not limited to employing field-based prediction when inserting dummy P pictures in a trick mode video signal. For instance, if dummy P frame pictures are to be inserted, then the dummy P frame pictures can be predicted merely using frame-based prediction. As an example, the first dummy P frame picture to be inserted can be predicted from the entire frame of the reference picture, even if the reference picture is a non-progressive picture. This type of prediction can permit dummy P frame pictures to be inserted anywhere in a GOP so long as such insertion is in accordance with relevant compression format standards.

Referring back to the method 200 of FIG. 2, there are several other steps that can be performed, if desired, to maintain a desired playback speed. Each time a dummy P picture is inserted in the trick mode video signal, the playback speed decreases, which may not be desirable. To overcome this drop in playback speed, a remaining original picture can be skipped when a dummy P picture is inserted, as shown at decision block 226 and step 228. If no original pictures are to be skipped, the method 200 can resume at step 222. The skipping of original pictures can be conducted in a manner such that the last picture in the GOP is a dummy P picture and the desired playback speed is maintained following the insertion of dummy P pictures.

Figure 4C:
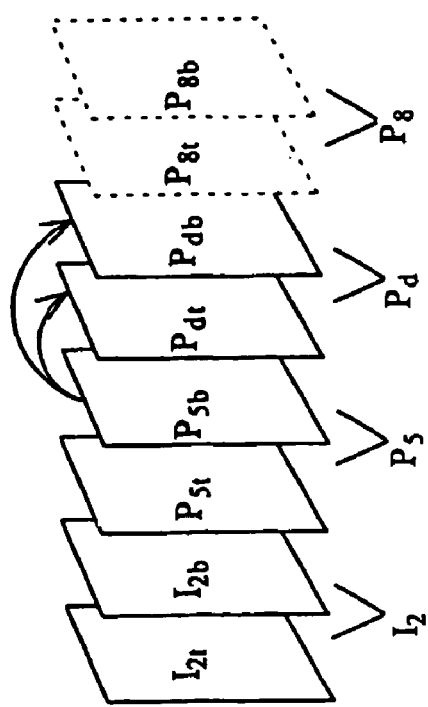
FIG. 4C illustrates yet another example of inserting dummy predictive pictures into a trick mode video signal in accordance with the inventive arrangements.

FIG. 4C shows an example in accordance with step 230 of FIG. 2. Similar to GOP 400, GOP 420 is a GOP in which the B pictures and the last two P pictures have been skipped. A first dummy P frame picture predicted from, for example, field $P_{5b}$ of picture $P_5$ can be inserted into the GOP 420, and picture $P_8$ can be skipped (the dashed lines represent a skipped or deleted picture). This one to one insertion/deletion correspondence can ensure that the intended trick mode speed is maintained.

Referring back to the method 200 of FIG. 2, at decision block 222, it can be determined whether the insertion of the first dummy P frame picture lowered the bit rate of the trick mode video signal below the predetermined threshold. If it did not, a second dummy P frame picture can be inserted into the trick mode video signal, as shown at step 224. The second dummy P frame picture can be predicted using any suitable prediction technique such as those discussed in relation to FIGS. 4A and 4B. That is, the second dummy P frame picture can be generated using field-based prediction in which its fields are predicted from, for example, the second field of the first dummy P frame picture. Alternatively, the fields of the second dummy P frame picture can be predicted from the first dummy P frame picture using frame-based prediction. This example is illustrated in GOP 430 of FIG. 4D.

Figure 4D:
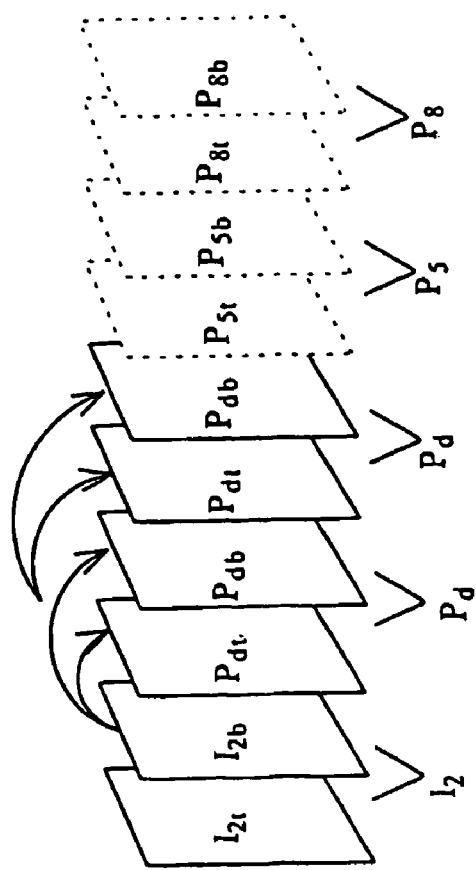
FIG. 4D illustrates yet another example of inserting dummy predictive pictures into a trick mode video signal in accordance with the inventive arrangements.

To maintain the desired playback speed and as also shown in FIG. 4D, picture $P_5$ can be skipped. As such, the first dummy P frame picture can be predicted from picture $I_2$. In accordance with the inventive arrangements, the fields of the first dummy P frame picture can be predicted from, for example, the field $I_{2b}$. Referring back to FIG. 2, the method 200 can resume at step 222 to ensure that the bit rate of the trick mode video signal does not exceed the predetermined threshold. Once the bit rate has been reduced to an acceptable level, the method 200 can continue at decision block 230, where it can be determined whether the trick mode is to continue. If yes, the method 200 can resume at step 214. If not, then normal playback can resume at step 232. It is understood that the method 200 is not limited in this regard, as the decision block 230 can be positioned at any other suitable location in the method 200.

As shown in FIG. 4C, the number of inserted dummy P pictures can equal the number of skipped original pictures, and these dummy P pictures can be inserted in the GOP such that a dummy P picture is the last picture in the GOP. Strategically inserting dummy P pictures into the trick mode video signal in such a way lowers the bit rate, maintains the intended playback speed and positions a dummy P picture as the last picture in the GOP to prevent future prediction problems in the GOP. It is understood that the invention is not limited to this particular example, as other insertion sequences can be conducted in accordance with the inventive arrangements.

The insertion of dummy P pictures can also reduce the choppiness of the display of a trick mode video signal, which can be particularly troublesome at a very fast motion trick mode. For example, referring back to GOP 300 in FIG. 3, if a 15× playback is to be performed (either in a forward or a reverse direction), then only picture $I_2$ will be decoded and displayed. This algorithm can also apply to any other fifteen picture GOPs in the trick mode video signal. Thus, only the I pictures in subsequent GOPs for a fast forward trick mode and preceding GOPs for a fast reverse trick mode will be decoded and displayed. Such a display, however, can be very choppy and may cause an uncomfortable viewing experience, as jumping from I picture to I picture at a high rate may be difficult to follow because of scene changes or sudden appearances and disappearances of objects in the display.

Continuing with the example, inserting one or more dummy P pictures into the trick mode video signal after each I picture, however, can enhance the display of the trick mode. For example, a number of dummy P pictures predicted from picture $I_2$ can be inserted into the trick mode video signal. Such an insertion can be in accordance with the discussion relating to the examples illustrated in FIGS. 4A and 4B to control the vibrating pictures artifact or any other suitable prediction scheme.

Because they are repeats of picture $I_2$, the dummy P pictures increase the amount of time the information in picture $I_2$ is displayed thereby reducing the choppiness of the display. This insertion step can also lower the average bit rate of the trick mode video signal, as, in this example, the signal will have a relatively high bit rate because only I pictures are being transmitted. To maintain the desired playback speed, subsequent or previous GOPs can be skipped following the insertion of the dummy P pictures. It is understood that the invention is not limited to this example, as this process can also apply to any other GOP, including twelve picture GOPs.

Although the present invention has been described in conjunction with the embodiments disclosed herein, it should be understood that the foregoing description is intended to illustrate and not limit the scope of the invention as defined by the claims.

The invention claimed is:

1. A method of performing a trick mode on a video signal containing a plurality of original pictures, comprising the steps of:

in response to a trick mode command, selectively skipping at least one of the original pictures to convert the video signal to a trick mode video signal; and selectively inserting at least one dummy predictive picture in the trick mode video signal using field-based prediction.

2. The method according to claim 1, further comprising the steps of:

monitoring the trick mode video signal; and wherein the step of selectively inserting at least one dummy predictive picture in the trick mode video signal is done if a bit rate of the trick mode video signal exceeds a predetermined threshold.

3. The method according to claim 1, wherein said selectively inserting step comprises the step of selectively inserting at least a first dummy predictive picture in the trick mode video signal using field-based prediction and subsequent dummy predictive pictures in the trick mode video signal using frame-based prediction.

4. The method according to claim 3, further comprising the step of predicting the at least first dummy predictive picture from a single field associated with a reference picture.

5. The method according to claim 4, wherein the reference picture is a picture selected from the group comprising an intra picture and a predictive picture.

6. The method according to claim 4, wherein the reference picture is a picture selected from the group comprising a non-progressive picture, a progressive picture and a field picture.

7. The method according to claim 4, wherein the plurality of original pictures is contained within a group of pictures and wherein the reference picture that is used to predict the at least first dummy predictive picture is the last original picture in the group of pictures such that no other original pictures are predicted from the inserted dummy predictive pictures.

8. The method according to claim 1, wherein the trick mode command is a fast motion trick mode.

9. The method according to claim 1, wherein each of the plurality of original pictures contains a display indicator and the method further comprises the step of selectively modifying the display indicator of at least a portion of the plurality of original pictures to reflect an intended display order when an original picture is skipped.

10. The method according to claim 9, wherein the display indicator is a temporal reference field.

11. The method according to claim 10, wherein each temporal reference field has an integer value and the step of selectively modifying the temporal reference field of at least a portion of the plurality of original pictures comprises the step of incrementally decreasing by one the integer value of the temporal reference field each time an original picture is skipped.

12. The method according to claim 1, further comprising the step of decoding at least a portion of the trick mode video signal with a remote decoder.

13. The method according to claim 1, wherein the plurality of original pictures is in a group of pictures and wherein the method further comprises the step of skipping a remaining original picture each time a dummy predictive picture is inserted in the trick mode video signal such that the last picture in the group of pictures is a dummy predictive picture and a desired playback speed is maintained following the insertion of the dummy predictive pictures.

14. In a remote decoder arrangement, a method of performing a trick mode on a video signal containing a plurality of original pictures, wherein each of the plurality of original pictures contains a display indicator, comprising the steps of:

in response to a trick mode command, selectively skipping at least one of the original pictures to convert the video signal to a trick mode video signal;

monitoring a bit rate of the trick mode video signal;

selectively inserting at least one dummy predictive picture in the trick mode video signal using field-based prediction if the bit rate exceeds a predetermined threshold; and selectively modifying the display indicator of at least a portion of the plurality of original pictures to reflect an intended display order when an original picture is skipped.

15. A system for performing a trick mode on a video signal containing a plurality of original pictures, comprising:

a controller for reading data from a storage medium and outputting the video signal containing the plurality of original pictures; and a processor, wherein the processor is programmed to:

in response to a trick mode command, selectively skip at least one of the original pictures to convert the video signal to a trick mode video signal; and selectively insert at least one dummy predictive picture in the trick mode video signal using field-based prediction.

16. The system according to claim 15, wherein the processor is further programmed to:

monitor the trick mode video signal; and selectively insert at least one dummy predictive picture in the trick mode video signal if the bit rate of the trick mode video signal exceeds a predetermined threshold.

17. The system according to claim 15, wherein the processor is further programmed to selectively insert at least a first dummy predictive picture in the trick mode video signal using field-based prediction and subsequent dummy predictive pictures in the trick mode video signal using frame-based prediction.

18. The system according to claim 17, wherein the processor is further programmed to predict the at least first dummy predictive picture from a single field associated with a reference picture.

19. The system according to claim 18, wherein the reference picture is a picture selected from the group comprising an intra picture and a predictive picture.

20. The system according to claim 18, wherein the reference picture is a picture selected from the group comprising a non-progressive picture, a progressive picture or a field picture.

21. The system according to claim 18, wherein the plurality of original pictures is contained within a group of pictures and wherein the reference picture that is used to predict the at least first dummy predictive picture is the last original picture in the group of pictures such that no other original pictures are predicted from the inserted dummy predictive pictures.

22. The system according to claim 15, wherein the trick mode command comprises a fast motion trick mode.

23. The system according to claim 15, wherein each of the plurality of original pictures contains a display indicator and the processor is further programmed to selectively modify the display indicator of at least a portion of the plurality of original pictures to reflect an intended display order when an original picture is skipped.

24. The system according to claim 23, wherein the display indicator comprises a temporal reference field.

25. The system according to claim 24, wherein each temporal reference field has an integer value and the processor is further programmed to selectively modify the temporal reference field of at least a portion of the plurality of original pictures by incrementally decreasing by one the integer value of the temporal reference field each time an original picture is skipped.

26. The system according to claim 15, further comprising a remote decoder for remotely decoding at least a portion of the trick mode video signal.

27. The system according to claim 15, wherein the plurality of original pictures is in a group of pictures and wherein the processor is further programmed to skip a remaining original picture each time a dummy predictive picture is inserted in the trick mode video signal such that the last picture in the group of pictures is a dummy predictive picture and a desired playback speed is maintained following the insertion of the dummy predictive pictures.

28. In a remote decoder arrangement, a system for performing a trick mode on a video signal containing a plurality of original pictures, wherein each of the plurality of original pictures contains a display indicator, comprising:

a controller for reading data from a storage medium and outputting the video signal containing the plurality of original pictures; and a processor, wherein the processor is programmed to:

in response to a trick mode command, selectively skip at least one of the original pictures to convert the video signal to a trick mode video signal;

monitor a bit rate of the trick mode video signal;

selectively insert at least one dummy predictive picture in the trick mode video signal using field-based prediction if the bit rate exceeds a predetermined threshold; and selectively modify the display indicator of at least a portion of the plurality of original pictures to reflect an intended display order when an original picture is skipped.

* * * * *

UNITED STATES PATENT AND TRADEMARK OFFICE
CERTIFICATE OF CORRECTION

PATENT NO. : 7,643,724 B2
APPLICATION NO. : 10/493349
DATED : January 5, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1428 days.

Signed and Sealed this

Sixteenth Day of November, 2010

David J. Kappos
*Director of the United States Patent and Trademark Office*